US012785813B2

(12) United States Patent
Xu et al.

(10) Patent No.: US 12,785,813 B2
(45) Date of Patent: Nov. 3, 2026

(54) SIGNAL PROCESSING SYSTEM AND TERMINAL DEVICE

(71) Applicant: Yinwang Intelligent Technologies Co., Ltd., Shenzhen (CN)

(72) Inventors: Zhongyang Xu, Nanjing (CN); Shilong Pan, Nanjing (CN); Tonghui Liu, Beijing (CN); Fengxi Yu, Nanjing (CN); Menglin Li, Beijing (CN); Hongying Wu, Beijing (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 231 days.

(21) Appl. No.: 18/658,148

(22) Filed: May 8, 2024

(65) Prior Publication Data

US 2024/0313863 A1 Sep. 19, 2024

Related U.S. Application Data

(63) Continuation of application No. PCT/CN2021/129751, filed on Nov. 10, 2021.

(51) Int. Cl.
*H04B 10/50* (2013.01)
*H04B 10/516* (2013.01)

(52) U.S. Cl.
CPC ......... *H04B 10/504* (2013.01); *H04B 10/516* (2013.01)

(58) Field of Classification Search
CPC .......... G01S 17/26; G01S 17/34; G01S 17/58; G01S 7/4911; H04B 10/504; H04B 10/516; H04B 10/548
See application file for complete search history.

(56) References Cited

U.S. PATENT DOCUMENTS 4,743,110 A 5/1988 Arnaud et al.
5,301,058 A * 4/1994 Olshansky ......... H04B 10/2507 359/254

(Continued)

FOREIGN PATENT DOCUMENTS

CN 101765128 A * 6/2010
CN 105136175 A * 12/2015

(Continued)

OTHER PUBLICATIONS

Photonics Coherent Random Modulated Continuous (Year: 2021).*

*Primary Examiner* — David C Payne
*Assistant Examiner* — Mohammed Abdelraheem
(74) *Attorney, Agent, or Firm* — Conley Rose, P.C.

(57) ABSTRACT

A signal processing system includes a modulation system and a transmission system. The modulation system is configured to perform first modulation processing on a first subcarrier signal to obtain a second subcarrier signal. The modulation system is further configured to perform second modulation processing on the second subcarrier signal and a first signal light to obtain a transmission signal light. The transmission signal light includes a single-frequency optical carrier signal and an optical sideband signal, and a frequency band of the single-frequency optical carrier signal and a frequency band of the optical sideband signal do not completely overlap. The transmission system is configured to transmit the transmission signal light.

20 Claims, 6 Drawing Sheets

(56) References Cited

U.S. PATENT DOCUMENTS

| | | | | | |
|---|---|---|---|---|---|
| 5,596,436 | A * | 1/1997 | Sargis | H04J 14/0298 398/76 | |
| 5,889,490 | A * | 3/1999 | Wachter | G01S 17/10 342/127 | |
| 6,525,857 | B1 * | 2/2003 | Way | H04B 10/506 398/201 | |
| 6,591,026 | B2 * | 7/2003 | Endo | H04B 10/506 385/20 | |
| 10,422,880 | B2 | 9/2019 | Crouch et al. | | |
| 2002/0097469 | A1 * | 7/2002 | Yee | H04B 10/2507 398/141 | |
| 2002/0149826 | A1 * | 10/2002 | Tanaka | H04B 10/5053 398/183 | |
| 2005/0286908 | A1 * | 12/2005 | Way | H04B 10/5165 398/186 | |
| 2007/0086788 | A1 * | 4/2007 | Monteiro | H04B 10/505 398/186 | |
| 2017/0350964 | A1 * | 12/2017 | Kaneda | G01S 7/4865 | |
| 2018/0224547 | A1 | 8/2018 | Crouch et al. | | |

FOREIGN PATENT DOCUMENTS

| | | | |
|---|---|---|---|
| CN | 107390232 | A | 11/2017 |
| CN | 110646779 | A | 1/2020 |
| CN | 112363146 | A | 2/2021 |

* cited by examiner

SIGNAL PROCESSING SYSTEM AND TERMINAL DEVICE

CROSS-REFERENCE TO RELATED APPLICATIONS

This is a continuation of International Patent Application No. PCT/CN2021/129751, filed on Nov. 10, 2021, the disclosure of which is hereby incorporated by reference in its entirety.

TECHNICAL FIELD

This disclosure relates to the field of light detection and ranging ("lidar") technologies, and in particular, to a signal processing system and a terminal device.

BACKGROUND

A phase-coded signal is a typical pulse compression signal. When a product of a time width and a bandwidth is small, a peak side-lobe ratio of the phase-coded signal is large and compression performance is good, and therefore the phase-coded signal can effectively resolve a conflict between an operating distance and resolution of a radar, and is widely used in a modern radar.

At present, phase coding is usually used to perform modulation processing on an optical carrier to obtain a transmission signal formed by a residual optical carrier and a phase-coded optical sideband signal, and then a Doppler frequency shift signal and a phase-coded signal are obtained based on a signal reflected by the transmission signal through a target and a local oscillator optical signal, to measure a relative movement speed and a relative distance between the target and a radar system based on the Doppler frequency shift signal and the phase-coded signal.

However, frequency bands of the residual optical carrier and the phase-coded optical sideband signal that are obtained in the foregoing modulation processing manner overlap, and a residual optical carrier signal and the phase-coded optical sideband signal cannot be separated. Consequently, precision of the Doppler frequency shift signal and the phase-coded signal is insufficient, and accuracy of distance measurement and speed measurement is low.

SUMMARY

Embodiments of this disclosure provide a signal processing system and a terminal device, to resolve a problem of frequency band overlapping between a residual optical carrier and a phase-coded optical sideband signal that are obtained after modulation processing.

According to a first aspect, an embodiment provides a signal processing system. The signal processing system includes a modulation unit and a transmission unit.

The modulation unit is configured to perform at least first modulation processing on a first subcarrier signal, to obtain a second subcarrier signal.

The modulation unit is further configured to perform at least second modulation processing on the second subcarrier signal and first signal light, to obtain transmission signal light. The transmission signal light includes a single-frequency optical carrier signal and an optical sideband signal, and a frequency band of the single-frequency optical carrier signal and a frequency band of the optical sideband signal do not completely overlap.

The transmission unit is configured to transmit the transmission signal light.

In this embodiment, the modulation unit in the signal processing system is configured to perform at least the first modulation processing on the first subcarrier signal to obtain the second subcarrier signal, and perform at least the second modulation processing on the input first signal light and the second subcarrier signal to obtain the transmission signal light. The transmission signal light is used to detect at least one target, and components of the transmission signal light mainly include the single-frequency optical carrier signal and the optical sideband signal. The frequency band of the single-frequency optical carrier signal and the frequency band of the optical sideband signal that are obtained through the foregoing modulation processing do not completely overlap. Therefore, the single-frequency optical carrier signal and the optical sideband signal may be separated, and a separation effect is good.

In a possible implementation, the modulation unit is configured to perform the first modulation processing, including performing phase modulation on the first subcarrier signal by using a phase-coded signal to obtain the second subcarrier signal.

In this embodiment, a possible implementation of the first modulation processing is provided. In this example, the modulation unit performs phase modulation on the first subcarrier signal by using the phase-coded signal, to obtain the second subcarrier signal. A phase of the obtained second subcarrier signal is different from a phase of the first subcarrier signal, and there is a phase shift to some extent. Therefore, the frequency band of the single-frequency optical carrier signal and the frequency band of the optical sideband signal that are obtained by subsequently performing modulation on the first signal light by using the second subcarrier signal may be enabled to not completely overlap. In addition, this embodiment is not limited to performing phase modulation on the first subcarrier signal by using the phase-coded signal to obtain the second subcarrier signal, and may also perform phase modulation on the first subcarrier signal by using another pulse compression signal, for example, a linear frequency modulation signal or a nonlinear frequency modulation signal. Phase modulation may be performed on the first subcarrier signal by using a signal that enables a phase shift of the second subcarrier signal relative to the first subcarrier signal.

In a possible implementation, that the modulation unit is configured to perform the second modulation processing includes performing modulation on the first signal light by using the second subcarrier signal to obtain the transmission signal light that includes the single-frequency optical carrier signal and the optical sideband signal.

In this embodiment, a possible implementation of the second modulation processing is provided. In this example, the modulation unit performs modulation on the first signal light by using the second subcarrier signal to obtain the transmission signal light that includes the single-frequency optical carrier signal and the optical sideband signal. The first signal light comes from signal light of a laser. Performing modulation on the first signal light may be accomplished by performing intensity modulation, and the transmission signal light is used to detect the at least one target, the frequency band of the single-frequency optical carrier signal and the frequency band of the optical sideband signal that are included in the transmission signal light do not completely overlap, so that a good separation effect can be implemented.

In a possible implementation, performing modulation on the first signal light by using the second subcarrier signal includes performing intensity modulation on the first signal light by using the second subcarrier signal.

In this embodiment, a possible implementation of the second modulation processing is provided. Performing modulation on the first signal light by using the second subcarrier signal may be accomplished by performing intensity modulation on the first signal light, so that the frequency band of the single-frequency optical carrier signal and the frequency band of the optical sideband signal that are obtained do not completely overlap.

In a possible implementation, the frequency band of the single-frequency optical carrier signal and the frequency band of the optical sideband signal do not overlap.

In this embodiment, when the phase shift of the second subcarrier signal obtained through the first modulation processing is large enough, frequency band spacing between the single-frequency optical carrier signal and the optical sideband signal that are included in the transmission signal light obtained through the second modulation processing is also large enough so that the frequency bands of the single-frequency optical carrier signal and the optical sideband signal do not overlap. In this case, compared with a case in which the frequency bands of the single-frequency optical carrier signal and the optical sideband signal do not completely overlap, a separation effect of the single-frequency optical carrier signal and the optical sideband signal is better.

In a possible implementation, the frequency band spacing between the single-frequency optical carrier signal and the optical sideband signal is greater than or equal to a frequency band bandwidth of the optical sideband signal.

In this embodiment, when the frequency band spacing between the single-frequency optical carrier signal and the optical sideband signal is greater than or equal to the frequency band bandwidth of the optical sideband signal, it can be implemented that the frequency band of the single-frequency optical carrier signal and the frequency band of the optical sideband signal do not overlap, so that the single-frequency optical carrier signal and the optical sideband signal are separated, and a separation effect is good.

In a possible implementation, the modulation unit includes a frequency mixer and a modulator.

The frequency mixer is configured to perform at least the first modulation processing.

The modulator is configured to perform at least the second modulation processing.

In this embodiment, a possible implementation of the modulation unit is provided. The modulation unit may include the frequency mixer and the modulator. The frequency mixer is configured to perform at least the first modulation processing, and the modulator is configured to perform at least the second modulation processing. By using the frequency mixer and the modulator, a problem of frequency band overlapping between a residual optical carrier and the optical sideband signal that are obtained after modulation processing can be resolved, so that a residual optical carrier signal and the optical sideband signal are separated, and a separation effect is good.

In a possible implementation, the frequency mixer includes an active frequency mixer or a passive frequency mixer, and is configured to move a signal from one frequency range to another frequency range, to generate a heterodyne signal; and the modulator includes an electro-optic modulator or a thermo-optic modulator, and is configured to perform modulation an amplitude, a phase, and the like of an optical signal.

In a possible implementation, the signal processing system further includes a beat frequency unit and a processing unit.

The beat frequency unit is configured to perform at least beat frequency processing on second signal light and reflected signal light, to output a Doppler frequency shift signal and a third subcarrier signal. The second signal light and the first signal light are two channels of signal light obtained after beam splitting processing is performed on one channel of signal light from the laser, the reflected signal light is reflected signal light corresponding to the transmission signal light, and a frequency band of the Doppler frequency shift signal and a frequency band of the third subcarrier signal do not overlap.

The processing unit is configured to process the Doppler frequency shift signal and the third subcarrier signal, to output a fourth subcarrier signal or detection information of the at least one target.

In this embodiment, the signal processing system further includes the beat frequency unit and the processing unit. The beat frequency unit is configured to, after performing at least the beat processing on the second signal light and the reflected signal light, output the Doppler frequency shift signal and the third subcarrier signal. The processing unit is configured to process the Doppler frequency shift signal and the third subcarrier signal to output the fourth subcarrier signal or a detection signal of the at least one target. The second signal light and the first signal light are two channels of signal light obtained after beam splitting processing is performed on one channel of signal light from the laser, and at least two channels of signal light should be obtained after beam splitting processing is performed on one channel of signal light from the laser. Optionally, more than two channels of signal light may be obtained. The reflected signal light is the reflected signal light corresponding to the transmission signal light. Therefore, the reflected signal light also includes the single-frequency optical carrier signal and the optical sideband signal. Because the frequency bands of the single-frequency optical carrier signal and the optical sideband signal do not overlap, and a frequency band of the Doppler frequency shift signal and a frequency band of the third subcarrier signal that are obtained through the beat frequency processing do not overlap either, precision of the Doppler frequency shift signal and the third subcarrier signal obtained through separation is high, and accuracy of implementing measurement of a relative movement speed and a relative distance between the target and the signal processing system based on the Doppler frequency shift signal and the third subcarrier signal is also high. The Doppler frequency shift signal is used to obtain the relative movement speed between the target and the signal processing system, the third subcarrier signal is used to obtain relative distance information between the target and the signal processing system, and the detection information of the target includes but is not limited to relative speed information and the relative distance information between the target and the signal processing system. Due to a Doppler effect caused by relative movement between the target and the signal processing system, the third subcarrier signal further has a specific Doppler frequency shift, and distance measurement by using the third subcarrier signal is not accurate enough. Therefore, Doppler compensation is performed on the third subcarrier signal by using the Doppler frequency shift signal, to obtain the fourth subcarrier signal. Compared with the third subcarrier signal, the fourth subcarrier signal has eliminated the Doppler frequency shift caused by the Doppler effect, and accuracy of distance measurement by using the fourth subcarrier signal can be greatly improved.

In a possible implementation, frequency band spacing between the Doppler frequency shift signal and the third subcarrier signal is greater than or equal to a frequency band bandwidth of the third subcarrier signal.

In this embodiment, when the frequency band spacing between the Doppler frequency shift signal and the third subcarrier signal is greater than or equal to the frequency band bandwidth of the third subcarrier signal, it can be implemented that the frequency band of the Doppler frequency shift signal and the frequency band of the third subcarrier signal do not overlap, so that the Doppler frequency shift signal and the third subcarrier signal are separated, and a separation effect is good.

In a possible implementation, the beat frequency unit includes a detector and a filter unit.

The detector is configured to perform the beat frequency processing.

The filter unit is configured to perform filtering processing, to output the Doppler frequency shift signal and the third subcarrier signal.

In this embodiment, a possible implementation of the beat frequency unit is provided. That is, the beat frequency unit may include the detector and the filter unit. The detector is configured to perform the beat processing to obtain a signal including the Doppler frequency shift signal and the third subcarrier signal. The filter unit is configured to perform the filtering processing on the signal, to separately output the Doppler frequency shift signal and the third subcarrier signal. By using the detector and the filter unit, a problem of frequency band overlapping that may exist between the Doppler frequency shift signal and the third subcarrier signal that are obtained after the beat frequency processing can be resolved, so that the Doppler frequency shift signal and the third subcarrier signal are separated, and a separation effect is good.

In a possible implementation, the Doppler frequency shift signal is obtained based on the second signal light and the single-frequency optical carrier signal in the reflected signal light, and the third subcarrier signal is obtained based on the second signal light and the optical sideband signal in the reflected signal light.

In this embodiment, after the beat frequency processing is performed at least on the second signal light and the reflected signal light, the Doppler frequency shift signal and the third subcarrier signal are output. The Doppler frequency shift signal is obtained based on the second signal light and the single-frequency optical carrier signal in the reflected signal light, and the third subcarrier signal is obtained based on the second signal light and the optical sideband signal in the reflected signal light.

In a possible implementation, the filter unit includes a first filter and a second filter.

The first filter is configured to perform filtering processing, to output the Doppler frequency shift signal.

The second filter is configured to perform filtering processing, to output the third subcarrier signal.

In this embodiment, a possible implementation of the filter unit is provided. The filter unit may include the first filter and the second filter. The first filter is configured to perform filtering processing, to output a low-frequency Doppler frequency shift signal, and the second filter is configured to perform filtering processing, to output a high-frequency third subcarrier signal. By using the first filter and the second filter, a problem of frequency band overlapping that may exist between the Doppler frequency shift signal and the third subcarrier signal that are obtained after the beat frequency processing, so that the Doppler frequency shift signal and the third subcarrier signal are separated, and a separation effect is good.

In a possible implementation, the first filter is a low-pass filter or a band-pass filter, and the second filter is a high-pass filter or a band-pass filter.

In this embodiment, the first filter may be the low-pass filter or the band-pass filter, and is configured to separate the low-frequency Doppler frequency shift signal, and the second filter may be the high-pass filter or the band-pass filter, and is configured to separate the high-frequency third subcarrier signal.

In a possible implementation, the filter unit further includes a power divider.

The power divider is configured to provide a signal input for the first filter and the second filter.

In this embodiment, the filter unit further includes the power divider, configured to divide, based on a proportion, one signal obtained after the beat frequency processing is performed by the beat frequency unit into two signals. The one signal is a signal including the Doppler frequency shift signal and the third subcarrier signal, the two signals are respectively used as signal inputs of the first filter and the second filter, and are respectively used to subsequently separate the low-frequency Doppler frequency shift signal and the high-frequency third subcarrier signal.

According to a second aspect, an embodiment provides a lidar system. The lidar system includes the signal processing system according to any one of the first aspect or the possible implementations of the first aspect. It should be noted that there may be a plurality of intelligent sensors integrated with sensors. When the intelligent sensor includes a laser detection function, the intelligent sensor may also be referred to as a lidar system.

According to a third aspect, an embodiment provides a terminal device. The terminal device includes the signal processing system according to any one of the first aspect or the possible implementations of the first aspect, or includes the lidar system according to the second aspect.

In this embodiment, modulation is performed based on a first subcarrier signal, to obtain a second subcarrier signal, and modulation is performed on first signal light by using the second subcarrier signal, so that transmission signal light that includes a single-frequency optical carrier signal and an optical sideband signal can be obtained. A frequency band of the single-frequency optical carrier signal and a frequency band of the optical sideband signal that are obtained through the foregoing modulation processing do not completely overlap, so that a problem of frequency band overlapping between a residual optical carrier and the optical sideband signal that are obtained after the modulation processing can be well resolved, to enable a residual optical carrier signal and the optical sideband signal to be separated.

BRIEF DESCRIPTION OF DRAWINGS

To describe the technical solutions in embodiments of this disclosure more clearly, the following briefly describes the accompanying drawings for describing embodiments. It is clear that the accompanying drawings in the following description show merely some embodiments of this disclosure, and a person of ordinary skill in the art may derive other drawings from these accompanying drawings without creative efforts.

DESCRIPTION OF EMBODIMENTS

Figure 1:
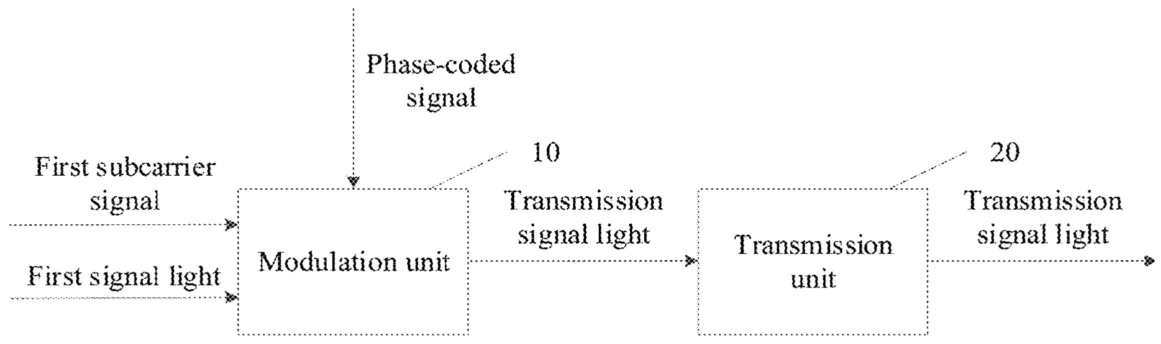
FIG. 1 is a schematic diagram of a structure of a signal processing system according to an embodiment.

To make objectives, technical solutions, and advantages of this disclosure clearer, the following describes embodiments with reference to the accompanying drawings.

In the specification, the claims, and the accompanying drawings, the terms "first", "second", and the like are intended to distinguish between different objects but do not indicate a particular order. In addition, terms "include", "have", or any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

An "embodiment" mentioned in this specification means that a particular feature, structure, or characteristic described with reference to this embodiment may be included in at least one embodiment of this disclosure. The phrase shown in various locations in this specification may not necessarily refer to a same embodiment, and is not an independent or optional embodiment exclusive from another embodiment. It is explicitly and implicitly understood by a person skilled in the art that embodiments described in this specification may be combined with another embodiment.

It should be understood that, in this disclosure, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

As described in the background, currently, it is necessary to study how to resolve the problem of frequency band overlapping between the residual optical carrier and the optical sideband signal. This disclosure provides a signal processing system and a terminal device, and relates to the field of lidar technologies, to effectively resolve a problem of frequency band overlapping between an optical carrier signal and an optical sideband signal.

To describe the solutions of this disclosure more clearly, the following first describes some knowledge related to a lidar.

Subcarrier: The subcarrier is an electronic communication signal carrier, and is carried on an upper end of another carrier, so that two signals can be transmitted at the same time. In subcarrier optical fiber communication, a to-be-transmitted signal is first used to modulate a radio frequency (a frequency from an ultrashort wave to a microwave) wave, and then the radio frequency wave is used to modulate a transmitting optical source. At a receiving point, an optical detector restores a radio frequency wave with a signal, and then a radio frequency detector restores the to-be-transmitted signal to an original signal.

Single-frequency optical carrier: An optical carrier (OC) is an optical signal that is modulated to transmit a signal. Generally, a frequency of the optical carrier wave is far higher than that of a modulated signal. During transmission by using the optical carrier, a signal of data may be loaded onto a signal of the carrier, and a receiver receives the signal of the data based on a frequency of the carrier, to implement information transmission. The single-frequency optical carrier generally refers to an optical carrier with a single frequency or a single frequency range.

Optical sideband: The optical sideband may be understood as a sideband of an optical signal. Generally, the optical signal is modulated. The optical sideband is classified into a single sideband and double sidebands. The double sidebands mean that there is a sideband on each side of a center frequency of the optical signal. A sideband greater than a center carrier frequency is an upper sideband, and a sideband less than the center carrier frequency is a lower sideband. The single sideband generally refers to an upper sideband or a lower sideband of the optical signal.

With rapid development of detection technologies, performance of a radar is required to be higher in an operating distance, resolution, and measurement precision. In order to improve a detection capability of the radar, the radar is required to have a large time width, bandwidth, and energy product. However, when peak power of a transmitting device of the radar is limited, a large signal energy can be obtained only by increasing a time width of a signal. Although an operating distance of the radar can be increased, the resolution becomes worse, that is, there is a conflict between the resolution and the operating distance.

Pulse compression is an important system of a modern radar, can effectively solve the conflict between the operating distance and the resolution of the radar, and is widely used in the modern radar. There are three typical types of pulse compression signals: a linear frequency modulation signal, a nonlinear frequency modulation signal, and a phase-coded signal. When a product of a time width and a bandwidth is small, a peak side-lobe ratio of the phase-coded signal is large and compression performance is good, and therefore the phase-coded signal is widely used.

At present, phase coding is usually used to perform modulation processing on an optical carrier to obtain a transmission signal formed by a residual optical carrier and a phase-coded optical sideband signal, and then a Doppler frequency shift signal and a phase-coded signal are obtained based on a signal reflected by the transmission signal through a target and a local oscillator optical signal, to measure a relative movement speed and a relative distance between the target and a radar system based on the Doppler frequency shift signal and the phase-coded signal.

However, frequency bands of the residual optical carrier and the phase-coded optical sideband signal that are obtained in the foregoing modulation processing manner overlap, and a residual optical carrier signal and the phase-coded optical sideband signal cannot be separated. Consequently, precision of the Doppler frequency shift signal and the phase-coded signal is insufficient, and accuracy of distance measurement and speed measurement is low.

In addition, in a process of performing pulse compression on an echo signal of the target by using the phase-coded signal, the echo signal is modulated due to a Doppler effect because the target and a platform on which the radar is carried have relative movement and a change of a seed laser carrier frequency in a round-trip time of a radar signal. Due to the Doppler effect, relative distance information between the target and the platform on which the radar is carried cannot be obtained by the phase-coded signal through pulse compression. This seriously affects performance of distance measurement.

Specifically, the Doppler effect refers to a phenomenon that when a wave source and the target have relative movement, a frequency at which the target receives a wave is different from a frequency at which the wave source sends a wave. Specifically, when the wave source moves to the target, the frequency of the wave received by the target increases; or when the wave source moves away from the target, the frequency of the wave received by the target decreases. When the target moves, the same conclusion can be obtained. A relative movement speed and a relative distance between the target and the wave source may be measured based on the Doppler frequency shift signal and the phase-coded signal by using the Doppler effect.

Based on a technical problem of frequency band overlapping between the residual optical carrier and the phase-coded optical sideband signal that are obtained in the current modulation processing manner, this application proposes a new signal processing system. The signal processing system performs modulation on a first subcarrier signal, to obtain a second subcarrier signal, and performs modulation on first signal light by using the second subcarrier signal, so that transmission signal light that includes a single-frequency optical carrier signal and an optical sideband signal can be obtained. A frequency band of the single-frequency optical carrier signal and a frequency band of the optical sideband signal that are obtained through the foregoing modulation processing do not completely overlap, so that a problem of frequency band overlapping between the residual optical carrier and the optical sideband signal that are obtained after the modulation processing can be resolved, to enable a residual optical carrier signal and the optical sideband signal to be separated.

The following describes a signal processing system provided in embodiments of this application with reference to the accompanying drawings in embodiments of this application.

Refer to FIG. 1. FIG. 1 is a schematic diagram of a structure of a signal processing system according to an embodiment.

As shown in FIG. 1, the signal processing system includes a modulation unit 10 and a transmission unit 20.

In some possible embodiments, functions of the modulation unit 10 and the transmission unit 20 are as follows.

The modulation unit 10 is configured to perform at least first modulation processing on a first subcarrier signal, to obtain a second subcarrier signal, and perform at least second modulation processing on input first signal light and the second subcarrier signal, to obtain transmission signal light.

The transmission unit 20 is configured to transmit the transmission signal light.

The transmission signal light is used to detect at least one target, and components of the transmission signal light mainly include a single-frequency optical carrier signal and an optical sideband signal. A frequency band of the single-frequency optical carrier signal and a frequency band of the optical sideband signal that are obtained through modulation processing performed by the modulation unit 10 do not completely overlap. Because the frequency band of the single-frequency optical carrier signal and the frequency band of the optical sideband signal do not completely overlap, the two signals may be separated. Therefore, a problem of frequency band overlapping between a residual optical carrier and the optical sideband signal that are obtained after the modulation processing in the current modulation processing manner can be resolved, so that a residual optical carrier signal and the optical sideband signal are separated, and a separation effect is good.

In some possible embodiments, the modulation unit 10 performing at least the first modulation processing on the first subcarrier signal may further include performing phase modulation on the first subcarrier signal by using a phase-coded signal, to obtain the second subcarrier signal. A phase of the obtained second subcarrier signal is different from a phase of the first subcarrier signal, and there is a phase shift to some extent. Therefore, the frequency band of the single-frequency optical carrier signal and the frequency band of the optical sideband signal that are obtained by subsequently performing modulation on the first signal light by using the second subcarrier signal do not completely overlap.

In addition, this embodiment is not limited to performing phase modulation on the first subcarrier signal by using the phase-coded signal to obtain the second subcarrier signal, and may also perform phase modulation on the first subcarrier signal by using another pulse compression signal, for example, a linear frequency modulation signal or a nonlinear frequency modulation signal. Phase modulation may be performed on the first subcarrier signal by using a signal that enables a phase shift of the second subcarrier signal relative to the first subcarrier signal.

In some possible embodiments, the modulation unit 10 performing at least the second modulation processing on the input first signal light and the second subcarrier signal may further include performing modulation on the first signal light by using the second subcarrier signal, to obtain the transmission signal light that includes the single-frequency optical carrier signal and the optical sideband signal.

The first signal light may be signal light from a laser, and performing modulation on the first signal light may be specifically performing intensity modulation. The intensity modulation herein refers to laser oscillation in which intensity (light intensity) of the first signal light changes with a modulation signal (the second subcarrier signal) regularly. Laser modulation generally adopts an intensity modulation form, because a receiver generally directly responds to a change of intensity of light received by the receiver. The transmission signal light is used to detect the at least one target, and the frequency band of the single-frequency optical carrier signal and the frequency band of the optical sideband signal that are included in the transmission signal light do not completely overlap, so that a good separation effect can be implemented.

In some possible embodiments, after the modulation processing performed by the modulation unit 10, the frequency band of the single-frequency optical carrier signal and the frequency band of the optical sideband signal that are obtained do not overlap. This may be classified into the following several possible example cases.

Case 1

When the phase of the second subcarrier signal obtained through the first modulation processing shifts, there is also specific spacing between the frequency bands between the single-frequency optical carrier signal and the optical sideband signal that are included in the transmission signal light obtained through the second modulation processing, so that the frequency bands of the single-frequency optical carrier signal and the optical sideband signal may not completely overlap. However, because the phase shift of the second subcarrier signal obtained through the first modulation processing is limited, the frequency band spacing between the single-frequency optical carrier signal and the optical sideband signal is also limited, and the frequency bands of the single-frequency optical carrier signal and the optical sideband signal may further partially overlap.

Case 2

When the phase shift of the second subcarrier signal obtained through the first modulation processing is large enough, the frequency band spacing between the single-frequency optical carrier signal and the optical sideband signal that are included in the transmission signal light obtained through the second modulation processing is also large enough, so that the frequency bands of the single-frequency optical carrier signal and the optical sideband signal do not completely overlap at all. Compared with the case in which the frequency bands of the single-frequency optical carrier signal and the optical sideband signal do not completely overlap in the foregoing case 1, in this case, a separation effect of the single-frequency optical carrier signal and the optical sideband signal is better.

Case 3

When the frequency band spacing between the single-frequency optical carrier signal and the optical sideband signal is greater than or equal to a frequency band bandwidth of the optical sideband signal, it can be implemented that the frequency band of the single-frequency optical carrier signal and the frequency band of the optical sideband signal do not overlap, so that the single-frequency optical carrier signal and the optical sideband signal are separated, and a separation effect is good. In this case, a problem of resource waste caused by excessively large frequency band spacing between the single-frequency optical carrier signal and the optical sideband signal caused by an excessively large phase shift in the foregoing case 2 can be avoided, that is, the frequency bands of the single-frequency optical carrier signal and the optical sideband signal may not overlap at all as long as the frequency band spacing between the single-frequency optical carrier signal and the optical sideband signal is greater than or equal to the frequency band bandwidth of the optical sideband signal, to achieve a good separation effect of the single-frequency optical carrier signal and the optical sideband signal.

In this embodiment, modulation is performed based on the first subcarrier signal, to obtain the second subcarrier signal, and modulation is performed on the first signal light by using the second subcarrier signal, so that transmission signal light that includes the single-frequency optical carrier signal and the optical sideband signal can be obtained. The frequency band of the single-frequency optical carrier signal and the frequency band of the optical sideband signal that are obtained through the foregoing modulation processing do not completely overlap, so that a problem of frequency band overlapping between the residual optical carrier and the optical sideband signal that are obtained after the modulation processing can be well resolved, to enable a residual optical carrier signal and the optical sideband signal to be separated.

The following describes a possible structure of the modulation unit 10 with reference to the accompanying drawings.

Figure 2:
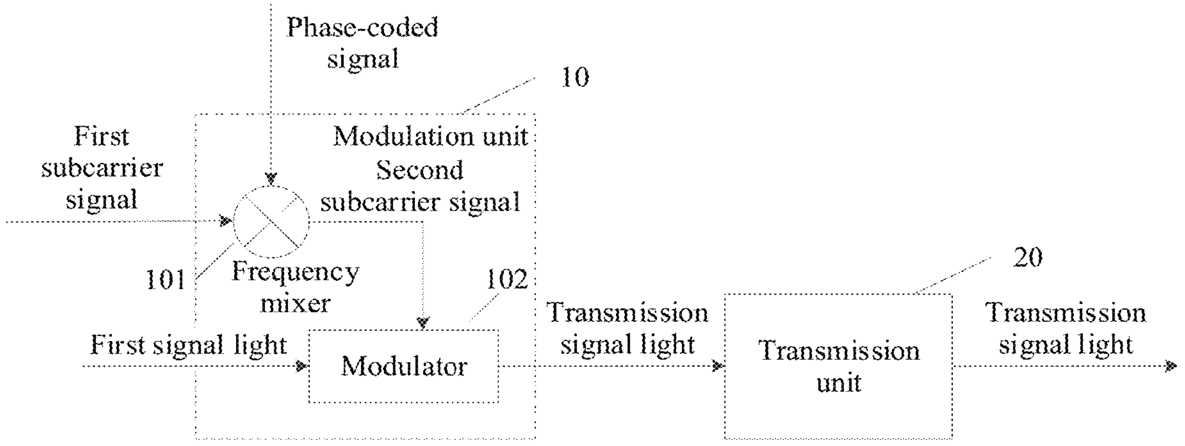
FIG. 2 is a schematic diagram of a structure of another signal processing system according to an embodiment.

Refer to FIG. 2. FIG. 2 is a schematic diagram of a structure of another signal processing system according to an embodiment.

As shown in FIG. 2, the modulation unit 10 includes a frequency mixer 101 and a modulator 102.

In some possible embodiments, functions of the frequency mixer 101 and the modulator 102 are as follows.

The frequency mixer 101 is configured to perform at least first modulation processing, that is, perform at least the first modulation processing on a first subcarrier signal, to obtain a second subcarrier signal. Phase modulation is performed on the first subcarrier signal by using a phase-coded signal, to obtain the second subcarrier signal. A phase of the obtained second subcarrier signal is different from a phase of the first subcarrier signal, and there is a phase shift to some extent. Therefore, a frequency band of a single-frequency optical carrier signal and a frequency band of an optical sideband signal that are obtained by subsequently performing modulation on first signal light by using the second subcarrier signal do not completely overlap.

Herein, it is not limited to performing phase modulation on the first subcarrier signal by using the phase-coded signal to obtain the second subcarrier signal, and phase modulation may also be performed on the first subcarrier signal by using another pulse compression signal, for example, a linear frequency modulation signal or a non-linear frequency modulation signal. Phase modulation may be performed on the first subcarrier signal by using a signal that enables a phase shift of the second subcarrier signal relative to the first subcarrier signal.

The modulator 102 is configured to perform at least second modulation processing, that is, perform at least the second modulation processing on the input first signal light and the second subcarrier signal, to obtain transmission signal light. Modulation is performed on the first signal light by using the second subcarrier signal, to obtain the transmission signal light that includes the single-frequency optical carrier signal and the optical sideband signal.

Herein, performing modulation on the first signal light may be performing intensity modulation. The intensity modulation refers to laser oscillation in which intensity (light intensity) of the first signal light changes with a modulation signal (the second subcarrier signal) regularly. Laser modulation generally adopts an intensity modulation form, because a receiver generally directly responds to a change of intensity of light received by the receiver.

In some possible embodiments, the frequency mixer 101 may be an active frequency mixer, a passive frequency mixer, or the like, and is configured to move a signal from a frequency range to another frequency range, to generate a heterodyne signal, and the modulator 102 may be an electro-optic modulator or a thermo-optic modulator, and is configured to perform modulation on an amplitude, a phase, or the like of an optical signal.

It may be understood that, after the frequency mixer 101 and the modulator 102 perform modulation processing, the frequency band of the single-frequency optical carrier signal and the frequency band of the optical sideband signal that are obtained do not overlap. A specific case is consistent with the foregoing case obtained after the modulation processing performed by the modulation unit 10, and details are not described herein again.

The following describes another possible structure of the signal processing system with reference to the accompanying drawings.

Figure 3:
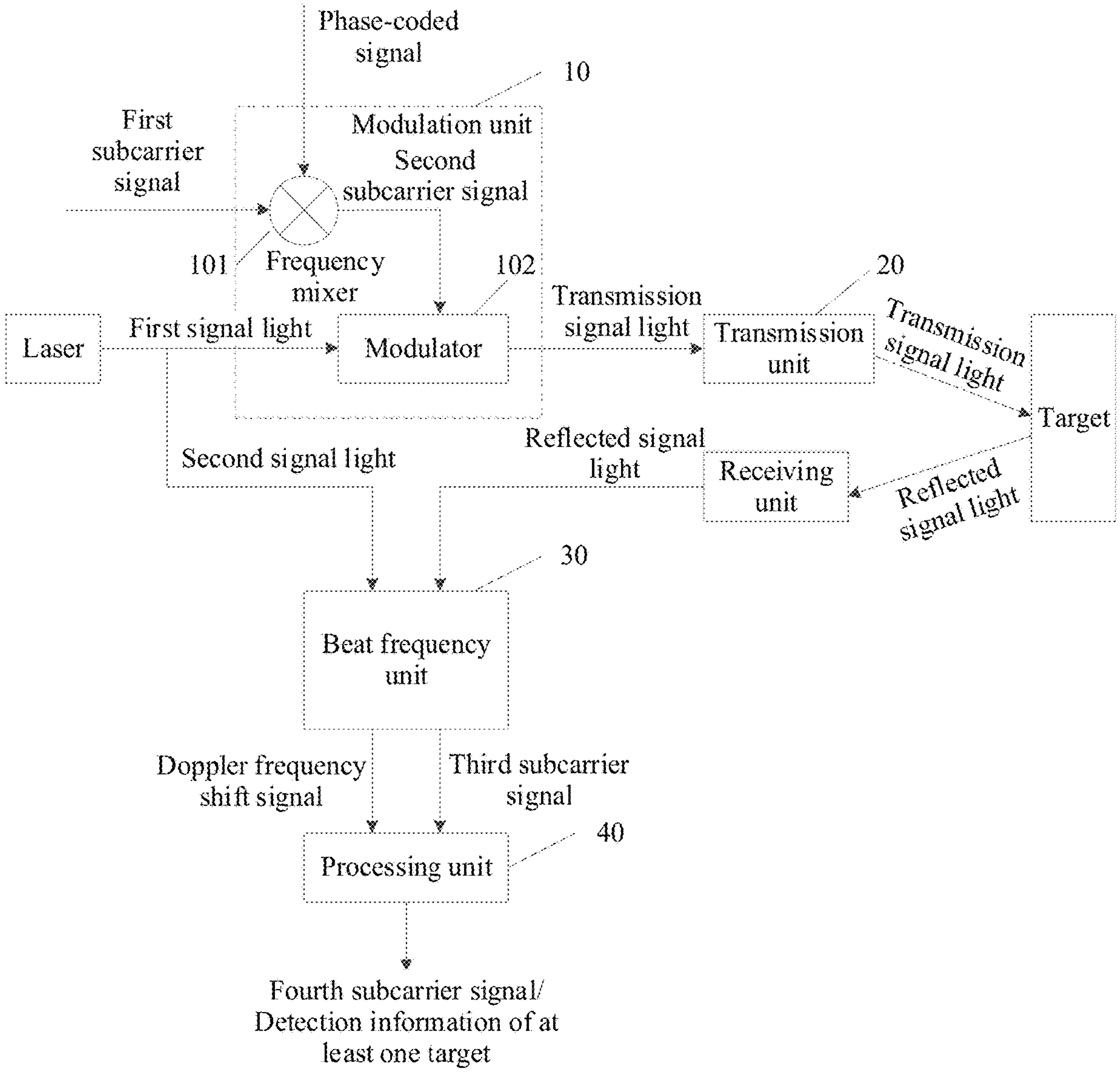
FIG. 3 is a schematic diagram of a structure of another signal processing system according to an embodiment.

Refer to FIG. 3. FIG. 3 is a schematic diagram of a structure of another signal processing system according to an embodiment.

As shown in FIG. 3, the signal processing system further includes a beat frequency unit 30 and a processing unit 40.

In some possible embodiments, functions of the beat frequency unit 30 and the processing unit 40 are as follows.

The beat frequency unit 30 is configured to, after performing at least beat processing on second signal light and reflected signal light, output a Doppler frequency shift signal and a third subcarrier signal.

The processing unit 40 is configured to process the Doppler frequency shift signal and the third subcarrier signal, to output a fourth subcarrier signal or a detection signal of at least one target.

The second signal light and first signal light are two channels of signal light obtained after beam splitting processing is performed on one channel of signal light from a laser, and at least two channels of signal light should be obtained after beam splitting processing is performed on the one channel of signal light from the laser. The beam splitting processing may be implemented by using a fiber beam splitter. Optionally, after the beam splitting processing, more than two channels of signal light may be obtained, and separately provide signal inputs for the beat frequency unit 30 and a modulation unit 10 (a modulator 102). The reflected signal light is reflected signal light corresponding to transmission signal light, and is signal light that is reflected by the transmission signal light through the at least one target, and a receiving unit may receive the reflected signal light. Therefore, components of the reflected signal light are similar to those of the transmission signal light, and also include a single-frequency optical carrier signal and an optical sideband signal.

In some possible embodiments, after the beat frequency processing performed by the beat frequency unit 30, a frequency band of the Doppler frequency shift signal and a frequency band of the third subcarrier signal that are obtained do not overlap. This may be classified into the following several possible example cases.

Case 1

When frequency band spacing between the single-frequency optical carrier signal and the optical sideband signal that are included in the reflected signal light is large enough, and frequency bands of the single-frequency optical carrier signal and the optical sideband signal do not overlap at all, the Doppler frequency shift signal is obtained based on the second signal light and the single-frequency optical carrier signal in the reflected signal light, and the third subcarrier signal is obtained based on the second signal light and the optical sideband signal in the reflected signal light. In this case, the frequency band of the Doppler frequency shift signal and the frequency band of the third subcarrier signal that are obtained do not overlap at all. Compared with a case in which the frequency bands of the Doppler frequency shift signal and the third subcarrier signal do not completely overlap, in this case, a separation effect of the Doppler frequency shift signal and the third subcarrier signal is better.

Case 2

When the frequency band spacing between the single-frequency optical carrier signal and the optical sideband signal that are included in the reflected signal light is greater than or equal to a frequency band bandwidth of the optical sideband signal, the Doppler frequency shift signal is obtained based on the second signal light and the single-frequency optical carrier signal in the reflected signal light, and the third subcarrier signal is obtained based on the second signal light and the optical sideband signal in the reflected signal light. In this case, the frequency band spacing between the Doppler frequency shift signal and the third subcarrier signal that are obtained is greater than or equal to a frequency band bandwidth of the third subcarrier signal, and it can be implemented that the frequency band of the Doppler frequency shift signal and the frequency band of the third subcarrier signal do not overlap, so that the Doppler frequency shift signal and the third subcarrier signal are separated, and a separation effect is good. In this case, a problem of resource waste caused by excessively large frequency band spacing between the Doppler frequency shift signal and the third subcarrier signal caused by excessively large frequency band spacing between the single-frequency optical carrier signal and the optical sideband signal in the foregoing case 1 may be avoided, that is, the frequency bands of the Doppler frequency shift signal and the third subcarrier signal may not overlap at all as long as the frequency band spacing between the Doppler frequency shift signal and the third subcarrier signal is greater than or equal to the frequency band bandwidth of the third subcarrier signal, and a good separation effect of the Doppler frequency shift signal and the third subcarrier signal is achieved.

Because the frequency band of the Doppler frequency shift signal and the frequency band of the third subcarrier signal that are obtained by the beat frequency unit 30 through performing the beat frequency processing do not overlap, precision of the Doppler frequency shift signal and the third subcarrier signal obtained through separation is high, and accuracy of implementing measurement of a relative movement speed and a relative distance between the target and the signal processing system based on the Doppler frequency shift signal and the third subcarrier signal is also high. The Doppler frequency shift signal is used to obtain the relative movement speed between the target and the signal processing system, the third subcarrier signal is used to obtain relative distance information between the target and the signal processing system, and detection information of the target includes but is not limited to relative speed information and the relative distance information between the target and the signal processing system. In addition, due to a Doppler effect caused by relative movement between the target and the signal processing system, the third subcarrier signal further has a specific Doppler frequency shift, and distance measurement by using the third subcarrier signal is not accurate enough. Therefore, Doppler compensation is performed on the third subcarrier signal by using the Doppler frequency shift signal, to obtain the fourth subcarrier signal. Compared with the third subcarrier signal, the fourth subcarrier signal has eliminated the Doppler frequency shift caused by the Doppler effect, and accuracy of distance measurement by using the fourth subcarrier signal can be greatly improved.

In some possible embodiments, that the processing unit 40 processes the Doppler frequency shift signal and the third subcarrier signal may be accomplished by performing Doppler compensation on the third subcarrier signal by using the Doppler frequency shift signal, to obtain the fourth subcarrier signal, and outputting the fourth subcarrier signal.

Alternatively, after the fourth subcarrier signal is obtained, the relative distance information between the target and the signal processing system is obtained by using the fourth subcarrier signal, and the relative movement speed between the target and the signal processing system is obtained by using the Doppler frequency shift signal, to output the detection information of the target that includes but is not limited to the relative speed information and the relative distance information between the target and the signal processing system.

In this embodiment, based on that the frequency bands of the single-frequency optical carrier signal and the optical sideband signal that are obtained through the foregoing modulation processing do not completely overlap, the frequency bands of the Doppler frequency shift signal and the third subcarrier signal that are obtained do not overlap by performing the beat processing on the second signal light and the reflected signal light that includes the single-frequency optical carrier signal and the optical sideband signal, thereby resolving a problem that the frequency bands of the signals obtained after the beat processing may overlap. In addition, the Doppler compensation is performed on the third subcarrier signal by using the Doppler frequency shift signal, to obtain the fourth subcarrier signal, so as to obtain the relative distance information between the target and the signal processing system by using the fourth subcarrier signal, and obtain the relative movement speed between the target and the signal processing system by using the Doppler frequency shift signal, thereby greatly improving precision of distance measurement and speed measurement of the target.

The following describes a possible structure of the beat frequency unit 30 with reference to the accompanying drawings.

Figure 4:
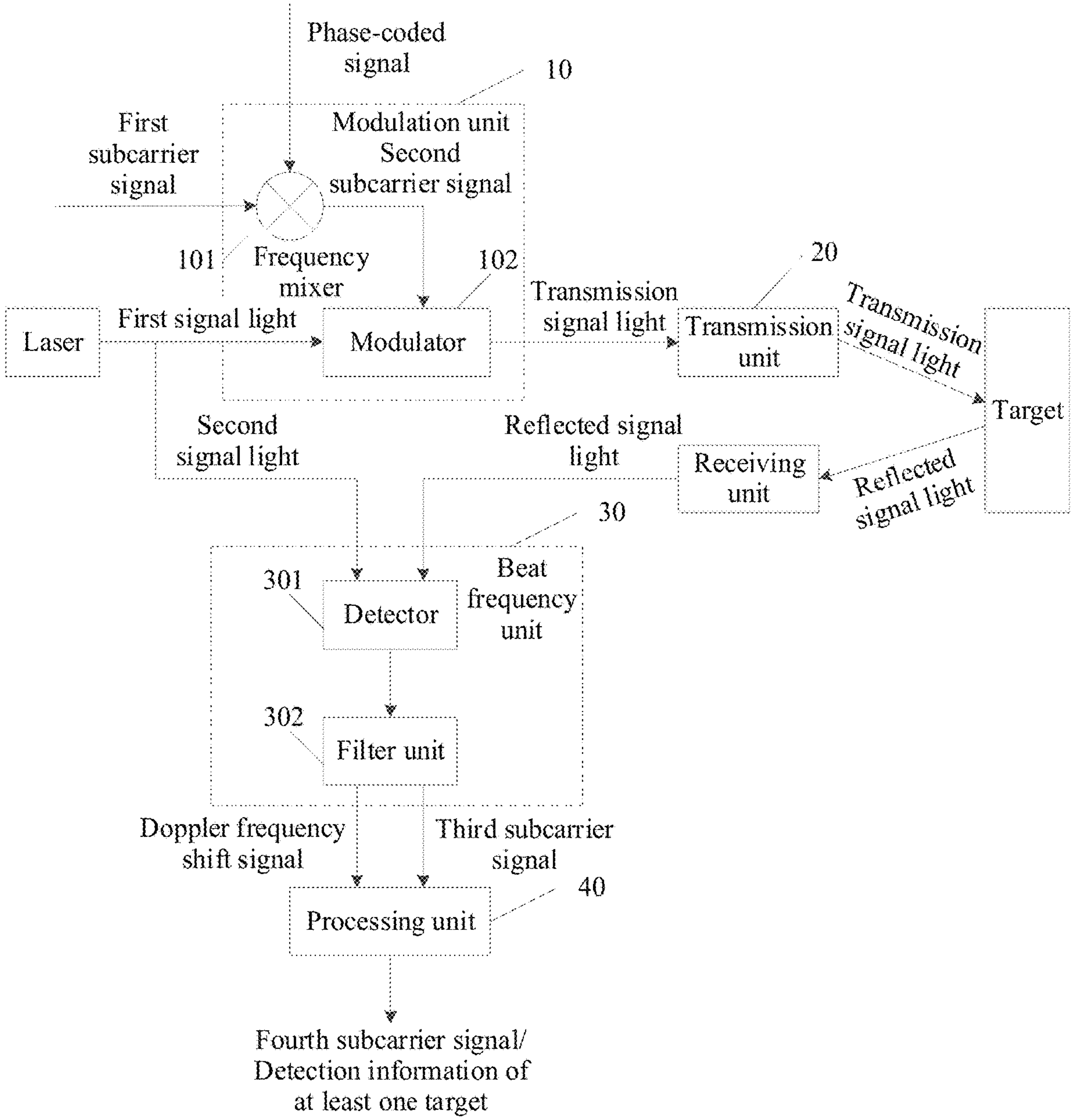
FIG. 4 is a schematic diagram of a structure of another signal processing system according to an embodiment.

Refer to FIG. 4. FIG. 4 is a schematic diagram of a structure of another signal processing system according to an embodiment.

As shown in FIG. 4, the beat frequency unit 30 includes a detector 301 and a filter unit 302.

In some possible embodiments, functions of the detector 301 and the filter unit 302 are as follows.

The detector 301 is configured to perform at least beat processing, that is, perform at least the beat processing on second signal light and reflected signal light, to obtain a signal that includes a Doppler frequency shift signal and a third subcarrier signal. The Doppler frequency shift signal is obtained based on the second signal light and a single-frequency optical carrier signal in the reflected signal light, and the third subcarrier signal is obtained based on the second signal light and an optical sideband signal in the reflected signal light.

The filter unit 302 is configured to perform filtering processing on the signal obtained by the detector 301, to separately output the Doppler frequency shift signal and the third subcarrier signal, so as to implement separation between the Doppler frequency shift signal and the third subcarrier signal.

It may be understood that, after the beat frequency processing of the detector 301, a frequency band of the Doppler frequency shift signal and a frequency band of the third subcarrier signal that are obtained do not overlap. A specific situation thereof is consistent with the situation obtained after the beat frequency processing of the beat frequency unit 30, and details are not described herein again.

The following describes a possible structure of the filter unit 302 with reference to the accompanying drawings.

Figure 5:
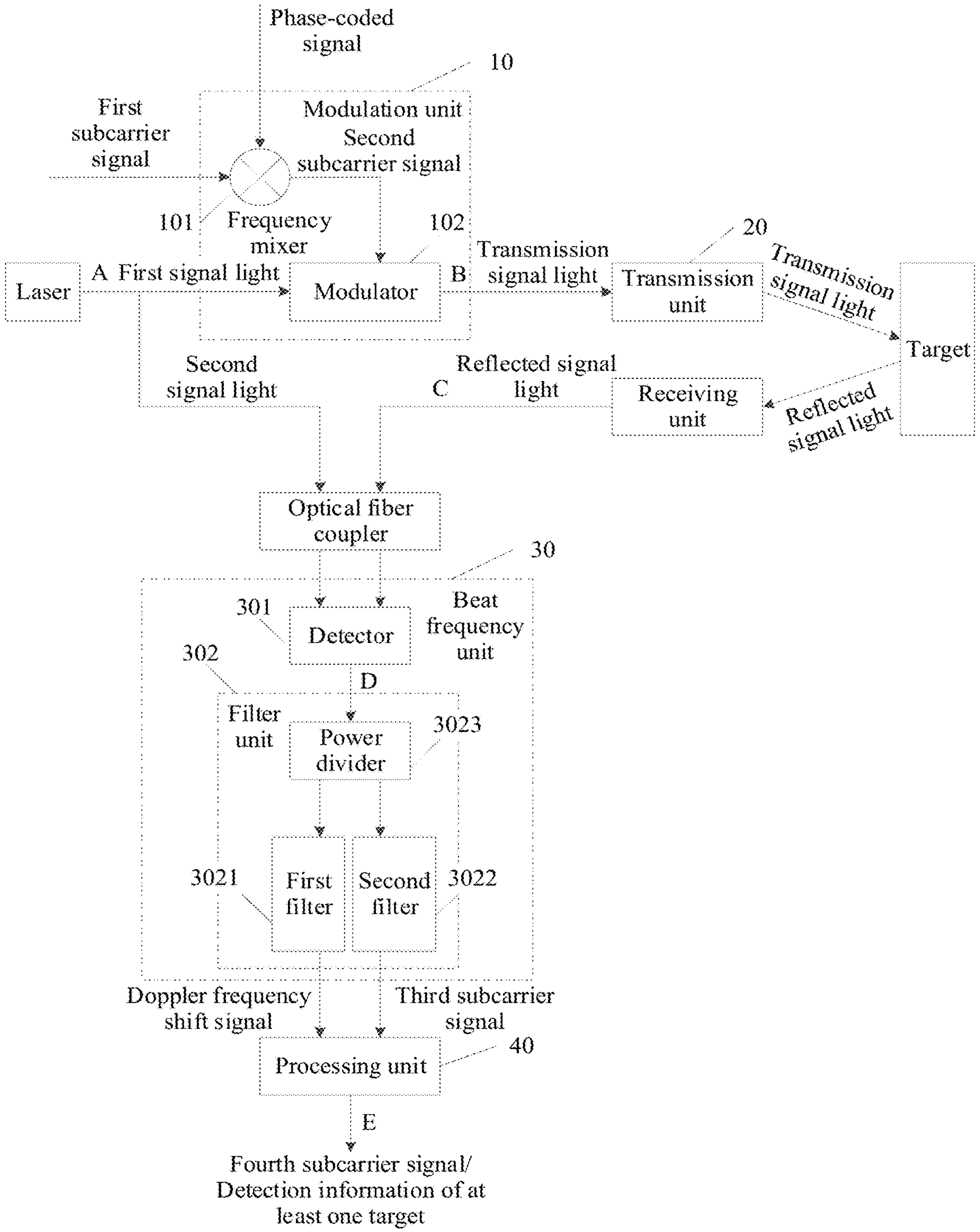
FIG. 5 is a schematic diagram of a structure of another signal processing system according to an embodiment.

Refer to FIG. 5. FIG. 5 is a schematic diagram of a structure of another signal processing system according to an embodiment.

As shown in FIG. 5, the filter unit 302 includes a first filter 3021 and a second filter 3022.

In some possible embodiments, functions of the first filter 3021 and the second filter 3022 are as follows.

The first filter 3021 is configured to perform filtering processing, to output a low-frequency Doppler frequency shift signal.

The second filter 3022 is configured to perform filtering processing, to output a high-frequency third subcarrier signal.

In this embodiment, by using the first filter 3021 and the second filter 3022, a Doppler frequency shift signal and a third subcarrier signal that are obtained after beat frequency processing may be separated, and a separation effect is good.

In some possible embodiments, the first filter 3021 may be a low-pass filter or a band-pass filter, and is configured to separate the low-frequency Doppler frequency shift signal; and the second filter 3022 may be a high-pass filter or a band-pass filter, and is configured to separate the high-frequency third subcarrier signal.

In some possible embodiments, the filter unit 302 further includes a power splitter 3023, and a function of the power splitter 3023 is as follows.

The power splitter 3023 is configured to divide, based on a proportion, one signal obtained after the beat frequency processing is performed into two signals. The one signal is a signal including the Doppler frequency shift signal and the third subcarrier signal, and the two signals are respectively used as signal inputs of the first filter 3021 and the second filter 3022, and are respectively used to subsequently separate the low-frequency Doppler frequency shift signal and the high-frequency third subcarrier signal.

In some possible embodiments, the signal processing system further includes an optical fiber coupler, and functions of the optical fiber coupler are as follows.

The optical fiber coupler is configured to: couple input second signal light and reflected signal light, and then transmit the second signal light and the reflected signal light to the detector 301, to perform subsequent beat processing.

The foregoing describes in detail the possible structure of the signal processing system in embodiments of this disclosure. The following describes a signal processing process performed by the signal processing system with reference to FIG. 6A to FIG. 6E.

For ease of understanding, the foregoing signal processing system shown in FIG. 5 is used as an example for description.

Figure 6A:
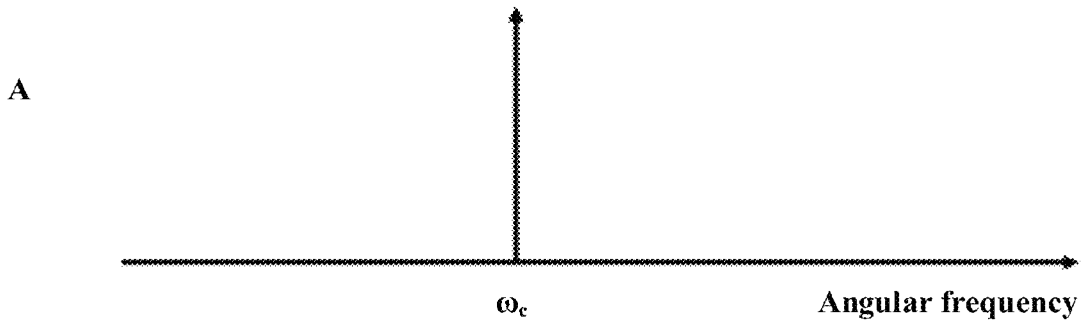
FIG. 6A is a schematic diagram of an angular frequency-amplitude of a signal according to an embodiment.

Refer to FIG. 6A. FIG. 6A is a schematic diagram of an angular frequency-amplitude of a signal according to an embodiment. The angular frequency-amplitude of the signal shown in FIG. 6A is an angular frequency-amplitude of first signal light output by a laser corresponding to a point A in FIG. 5, and may be represented as follows:

$$E_{in}(t)=E_0\exp(i\omega_c t)$$

Herein, $E_{in}(t)$ represents the first signal light, and $\omega_c$ represents an angular frequency of the first signal light.

Figure 6B:
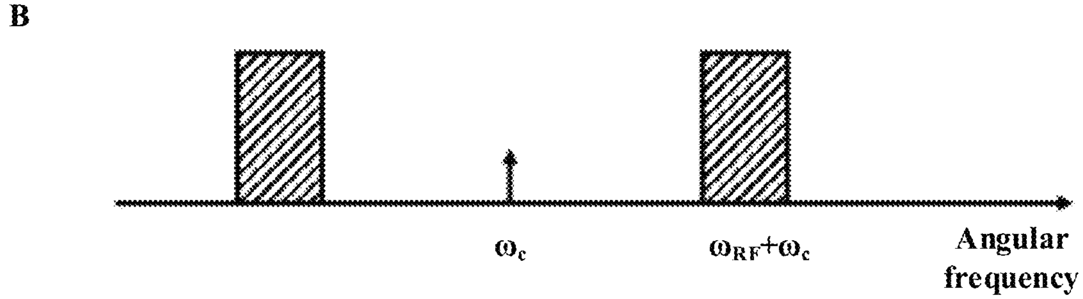
FIG. 6B is a schematic diagram of an angular frequency-amplitude of a signal according to an embodiment.

After the first signal light is modulated by the modulator 102, a schematic diagram of an angular frequency-amplitude of a signal shown in FIG. 6B is obtained. Refer to FIG. 6B. The angular frequency-amplitude of the signal shown in FIG. 6B is an angular frequency-amplitude of transmission signal light output by the modulator 102 corresponding to a point B in FIG. 5, and may be represented as follows:

$$E_{MZM}(t)=\sqrt{2}E_0\cos\left[\frac{\pi}{2}\frac{V_{RF}}{V_\pi}\cos(\omega_{RF}t+\theta_n(t))+\frac{\pi}{2}\frac{V_b}{V_\pi}\right]\exp(i\omega_c t)$$

$$E_{MZM}(t)=\sqrt{2}E_0\cos[\beta\cos(\omega_{RF}t+\theta_n(t))+\varphi]\exp(i\omega_c t)$$

Herein, $E_{MZM}(t)$ represents the transmission signal light, $\omega_{RF}$ represents an angular frequency of a second subcarrier signal, $\theta_n(t)$ represents a phase-coded signal, a value of $\theta_n(t)$ is 0 or $\pi$, $V_\pi$ represents a half-wave voltage of the modulator 102, $V_{RF}$ represents an alternating current drive voltage amplitude, $V_b$ represents s direct current bias voltage, $$\beta=\frac{\pi}{2}\frac{V_{RF}}{V_\pi}$$

represents a modulation coefficient, and $$\varphi=\frac{\pi}{2}\frac{V_b}{V_\pi}$$

represents a phase of the modulator 102.

Figure 6C:
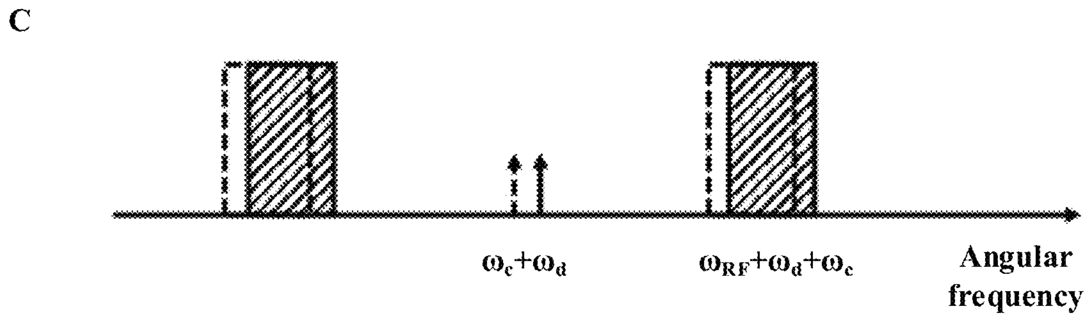
FIG. 6C is a schematic diagram of an angular frequency-amplitude of a signal according to an embodiment.

The transmission signal light is transmitted by using a transmission unit, and is reflected through at least one target. A reflected signal corresponding to the transmission signal light may be obtained by using the receiving unit, that is, a schematic diagram of an angular frequency-amplitude of a signal shown in FIG. 6C. Refer to FIG. 6C. The angular frequency-amplitude of the signal shown in FIG. 6C is an angular frequency-amplitude of reflected signal light received by the receiving unit corresponding to a point C in FIG. 5, and may be represented as follows:

$$E_\tau(t-\tau)=\sqrt{2k}E_0\cos\{\beta\cos[\omega_{RF}(t-\tau)+\theta_n(t-\tau)]+\varphi\}\exp[i(\omega_c+\omega_d)(t-\tau)]$$

Herein, $E_\tau(t-\tau)$ represents the reflected signal light, $\tau$ represents a delay time of the reflected signal light, k represents a power attenuation coefficient in a transmission process of the reflected signal light, and $\omega_d$ represents a Doppler frequency shift.

The reflected signal light and second signal light transmitted by the laser enter the detector 301 after being coupled by an optical fiber coupler, to perform beat frequency processing. The second signal light herein is also referred to as a local oscillator optical signal, and may be represented as follows:

$$E_{LO}(t)=E_{LO}\exp(i\omega_c t)$$

Figure 6D:
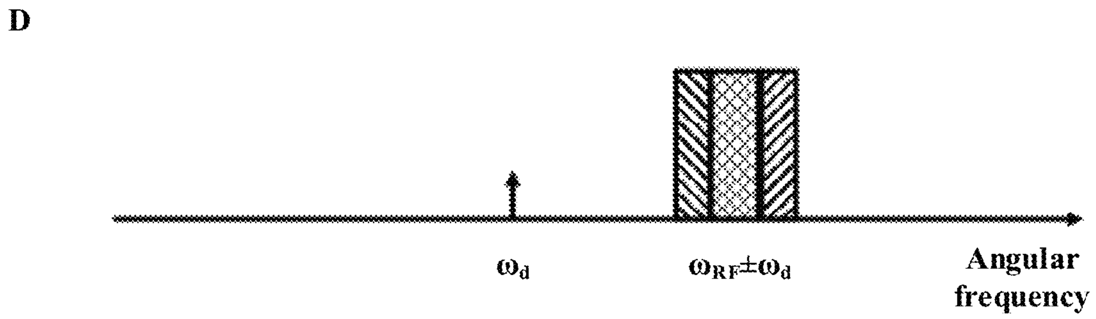
FIG. 6D is a schematic diagram of an angular frequency-amplitude of a signal according to an embodiment.

After performing beat frequency processing on the second signal light and the reflected signal light, the detector 301 may obtain an electrical signal, that is, a schematic diagram of an angular frequency-amplitude of a signal shown in FIG. 6D. Refer to FIG. 6D. The angular frequency-amplitude of the signal shown in FIG. 6D is an angular frequency-amplitude of the electrical signal output by the detector 301 corresponding to a point D in FIG. 5, and may be represented as follows:

$$i_{BPD}(t)\propto\cos(\omega_d t+\phi)\cos\{\beta\cos[\omega_{RF}(t-\tau)+\theta_n(t-\tau)]+\varphi\}$$

Herein, $i_{BPD}(t)$ represents the electrical signal obtained after the beat frequency processing is performed on the second signal light and the reflected signal light, and includes a Doppler frequency shift signal and a third subcarrier signal.

Two-phase code is used as an example for description. In a case of small-signal modulation, after the foregoing signal $i_{BPD}(t)$ is filtered by the first filter 3021 and the second filter 3022, the Doppler frequency shift signal and the third subcarrier signal are obtained respectively, and may be represented as follows:

$$i_{low}(t)\propto J_0(\beta)\cos(\omega_d t+\phi)\cos\varphi$$

$$i_{high}(t)\propto\pm J_1(\beta)\cos[\omega_{RF}(t-\tau)+\theta_n(t-\tau)]\cos(\omega_d t+\phi)\sin\varphi$$

Herein, a low frequency signal $i_{low}(t)$ represents the Doppler frequency shift signal, and a high frequency signal $i_{high}(t)$ represents the third subcarrier signal.

By adjusting a bias voltage of the modulator 102, strength of a low-frequency current signal and strength of a high-frequency current signal may be adjusted. Because the third subcarrier signal is a wideband signal, a high signal-to-noise ratio can generally be obtained only when high signal power is required. Therefore, in an actual signal processing system, $\varphi$ usually uses a value close to $$\frac{\pi}{2}.$$

Because the Doppler frequency shift signal and the third subcarrier signal can be well separated in frequency domain, a Doppler frequency shift signal with lower strength can still be measured. In addition, impact of the Doppler frequency shift signal is eliminated from the high frequency signal. This helps to obtain better precision of distance measurement.

Figure 6E:
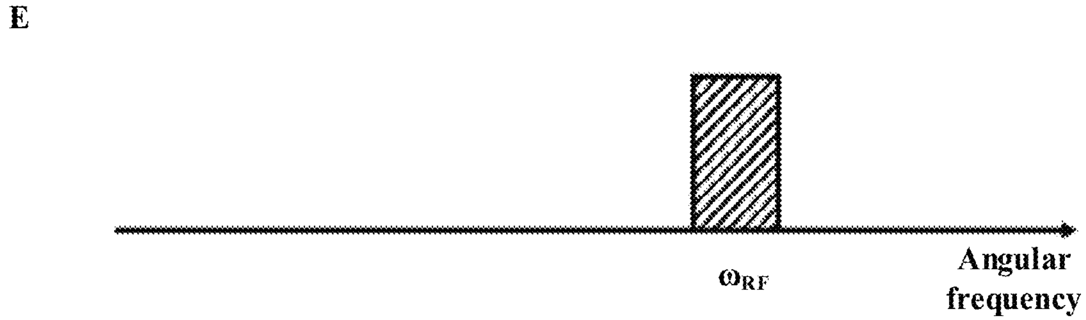
FIG. 6E is a schematic diagram of an angular frequency-amplitude of a signal according to an embodiment.

During distance measurement, the Doppler frequency shift signal and the third subcarrier signal are input to the processing unit 40, and the processing unit 40 performs Doppler compensation on the third subcarrier signal by using the Doppler frequency shift signal, to obtain a fourth subcarrier signal, that is, a schematic diagram of an angular frequency-amplitude of a signal shown in FIG. 6E. Refer to FIG. 6E. The angular frequency-amplitude of the signal shown in FIG. 6E is an angular frequency-amplitude of the fourth subcarrier signal output by the processing unit 40 corresponding to a point E in FIG. 5, and may be expressed as follows:

$$i_{high}(t)\propto\pm J_1(\beta)\cos[\omega_{RF}(t-\tau)+\theta_n(t-\tau)]\sin\varphi$$

Pulse compression is performed on the fourth subcarrier signal and an original current signal $v(t)=V_{RF}\cos[\omega_{RF}t+\theta_n t]$, to obtain relative distance information between the target and the signal processing system and corresponding delay information.

In conclusion, according to the signal processing system provided in this application, modulation is performed on the first subcarrier signal, to obtain the second subcarrier signal, and modulation is performed on the first signal light by using the second subcarrier signal, so that the transmission signal light that includes the single-frequency optical carrier signal and the optical sideband signal can be obtained. The frequency band of the single-frequency optical carrier signal and the frequency band of the optical sideband signal that are obtained through the foregoing modulation processing do not completely overlap, so that the problem of frequency band overlapping between the residual optical carrier and the optical sideband signal that are obtained after the modulation processing can be resolved, to enable a residual optical carrier signal and the optical sideband signal to be separated.

This application provides a terminal device. The terminal device includes the signal processing system provided in this application. For example, the terminal device may be a means of transportation, for example, an automobile, a truck, an aircraft, an unmanned aerial vehicle, a slow transport vehicle, a spacecraft, a ship, or any other means of transportation used in any possible scenario, or may be any device that carries a laser detection apparatus, such as a surveying and mapping device. One or more signal processing systems provided in this application are deployed on the terminal device.

The foregoing descriptions are merely specific implementations of this disclosure, but the protection scope of this disclosure is not limited thereto. Any variation or replacement readily figured out by a person skilled in the art within the technical scope disclosed shall fall within the protection scope of this disclosure. Therefore, the protection scope shall be subject to the protection scope of the claims.

What is claimed is:

1. A signal processing system, comprising:

a modulator configured to:

perform first modulation processing on a first subcarrier signal to obtain a second subcarrier signal;

perform second modulation processing on the second subcarrier signal and a first signal light to obtain a transmission signal light comprising a single-frequency optical carrier signal and an optical sideband signal, wherein a frequency band spacing between the single-frequency optical carrier signal and the optical sideband signal is greater than or equal to a frequency bandwidth of the optical sideband signal; and a transmitter configured to transmit the transmission signal light.

2. The signal processing system of claim 1, wherein the first modulation comprises phase modulation using a phase-coded signal.

3. The signal processing system of claim 1, wherein the frequency band of the single-frequency optical carrier signal and the frequency band of the optical sideband signal do not overlap at all.

4. The signal processing system of claim 1, wherein the modulator comprises a frequency mixer configured to perform the first modulation processing.

5. The signal processing system of claim 1, wherein the signal processing system further comprises:

a beat frequency system configured to perform beat frequency processing on second signal light and reflected signal light to obtain a Doppler frequency shift signal and a third subcarrier signal, wherein the second signal light and the first signal light are two channels of signal light based on beam splitting processing on one channel of signal light from a laser, wherein the reflected signal light is reflected signal light corresponding to the transmission signal light, and wherein frequency bands of the Doppler frequency shift signal and the third subcarrier signal do not overlap; and a processor configured to process the Doppler frequency shift signal and the third subcarrier signal to obtain a fourth subcarrier signal or detection information of at least one target.

6. The signal processing system of claim 5, wherein the beat frequency system comprises:

a detector configured to perform the beat frequency processing; and a filter configured to perform filtering processing to obtain the Doppler frequency shift signal and the third subcarrier signal.

7. The signal processing system of claim 5, wherein the Doppler frequency shift signal is based on the second signal light and the single-frequency optical carrier signal in the reflected signal light, and wherein the third subcarrier signal is based on the second signal light and the optical sideband signal in the reflected signal light.

8. The signal processing system of claim 6, wherein the filter comprises:

a first filter configured to perform filtering processing to obtain the Doppler frequency shift signal; and a second filter configured to perform filtering processing to obtain the third subcarrier signal.

9. The signal processing system of claim 8, wherein the filter further comprises a power divider configured to provide a signal input for the first filter and the second filter.

10. A signal processing method comprising:

performing first modulation processing on a first subcarrier signal to obtain a second subcarrier signal;

performing second modulation processing on the second subcarrier signal and first signal light to obtain transmission signal light comprising a single-frequency optical carrier signal and an optical sideband signal, wherein a frequency band spacing between the single-frequency optical carrier signal and the optical sideband signal is greater than or equal to a frequency bandwidth of the optical sideband signal; and transmitting the transmission signal light.

11. The method of claim 10, wherein the first modulation comprises phase modulation using a phase-coded signal.

12. The method of claim 10, wherein the second modulation comprises modulating the first signal light using the second subcarrier signal.

13. The method of claim 10, wherein the frequency band of the single-frequency optical carrier signal and the frequency band of the optical sideband signal do not overlap.

14. The method of claim 10, wherein the first modulation processing comprises frequency mixing.

15. The method of claim 10, further comprising:

performing beat frequency processing on second signal light and reflected signal light to obtain a Doppler frequency shift signal and a third subcarrier signal, wherein the second signal light and the first signal light are two channels of signal light obtained after beam splitting processing is performed on one channel of signal light from a laser, wherein the reflected signal light is reflected signal light corresponding to the transmission signal light, and wherein frequency bands of the Doppler frequency shift signal and the third subcarrier signal do not overlap; and processing the Doppler frequency shift signal and the third subcarrier signal to obtain a fourth subcarrier signal or detection information of at least one target.

16. The method of claim 15, wherein the beat frequency processing comprises:

performing, using the detector, the beat frequency processing; and performing filtering processing to obtain the Doppler frequency shift signal and the third subcarrier signal.

17. The method of claim 15, wherein the Doppler frequency shift signal is obtained based on the second signal light and the single-frequency optical carrier signal in the reflected signal light, and wherein the third subcarrier signal is obtained based on the second signal light and the optical sideband signal in the reflected signal light.

18. The method of claim 16, further comprising:

performing filtering processing to obtain the Doppler frequency shift signal; and performing filtering processing to obtain the third subcarrier signal.

19. The method of claim 18, wherein filtering further comprises providing, using a power divider, a signal input for a first filter and a second filter.

20. A signal processing system comprising:

a laser configured to generate a signal light;

a beam splitter configured to split the signal light into a first signal light and a second signal light;

a modulator configured to:

perform first modulation processing on a first subcarrier signal using a phase-coded signal to obtain a second subcarrier signal; and perform second modulation processing comprising intensity modulation of the first signal light using the second subcarrier signal to obtain a transmission signal light comprising a single-frequency optical carrier signal and an optical sideband signal, wherein a frequency band spacing between the single-frequency optical carrier signal and the optical sideband signal is greater than or equal to a frequency band bandwidth of the optical sideband signal;

a transmitter configured to transmit the transmission signal light toward at least one target;

a beat frequency system comprising a detector configured to perform beat frequency processing on the second signal light and reflected signal light corresponding to the transmission signal light, and a filter unit configured to filter an output of the beat frequency processing to obtain a Doppler frequency shift signal and a third subcarrier signal, wherein frequency bands of the Doppler frequency shift signal and the third subcarrier signal do not overlap; and a processor configured to perform Doppler compensation on the third subcarrier signal using the Doppler frequency shift signal to obtain a fourth subcarrier signal.

* * * * *